United States Patent [19]

Portilla

[11] Patent Number: 4,989,525
[45] Date of Patent: Feb. 5, 1991

[54] SEWING APPARATUS AND METHOD FOR MANUFACTURING VEHICULAR AIR BAGS

[76] Inventor: Mario Portilla, Pine Brook, Montville, N.J. 07006

[21] Appl. No.: 489,667

[22] Filed: Mar. 7, 1990

[51] Int. Cl.$^5$ .................. D05B 13/00; D05B 21/00; D05B 25/00; B60H 21/16
[52] U.S. Cl. ........................... 112/10; 112/63; 112/121.14; 112/121.12; 112/262.2; 112/155; 280/743
[58] Field of Search ............ 112/262.1, 262.2, 121.14, 112/121.12, 121.15, 2, 63, 155, 10; 280/728, 731, 732, 743

[56] References Cited

U.S. PATENT DOCUMENTS

| | | |
|---|---|---|
| 3,273,524 | 9/1966 | Koltun .......................... 112/262.2 |
| 3,810,654 | 5/1974 | De Bano, Jr. et al. ............. 280/743 |
| 3,865,058 | 2/1975 | Rovin et al. ..................... 112/10 X |
| 4,503,788 | 3/1985 | Giannuzzi et al. ......... 112/121.14 X |
| 4,592,295 | 6/1986 | Cordier ............................ 112/155 X |
| 4,913,461 | 4/1990 | Cuevas .............................. 280/731 |
| 4,915,040 | 4/1990 | Sakuma et al. .................... 112/63 X |

*Primary Examiner*—Peter Nerbun
*Attorney, Agent, or Firm*—Anthony J. Casella; Gerald E. Hespos

[57] ABSTRACT

A sewing apparatus is provided for sewing vehicular air bags. Each air bags includes first and second side panels and a main body panel extending therebetween. First and second sewing machines are provided for sewing the seams between the respective first and second side panels and the main body panel. The sewing apparatus comprises at least one rotatable template to which the air bag side panels are mounted. Rotation of the templates advances peripheral portions of the side panels into proximity to the sewing machine, while longitudinal side edges of the main body panel are simultaneously advanced into the sewing machine. The apparatus includes motors and/or air cylinders for moving the first and second sewing machines and the templates towards or away from one another, and for adjusting the relative elevation of the templates and air bag side panels relative to the sewing machines. The apparatus further includes motors for moving the sewing machines toward or away from one another relative to the templates and for adjusting the rotational orientations of the sewing machines. A controller operatively controls the movements of the templates and sewing machines and the speeds of the sewing machines.

12 Claims, 2 Drawing Sheets

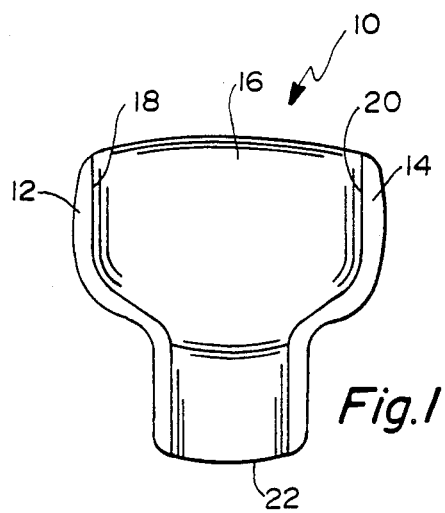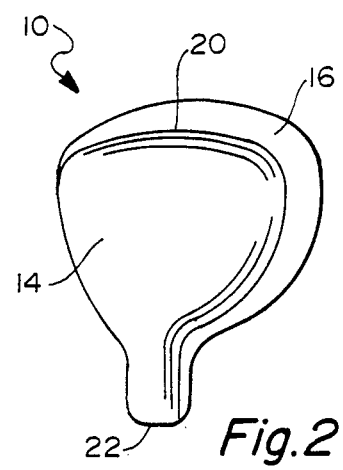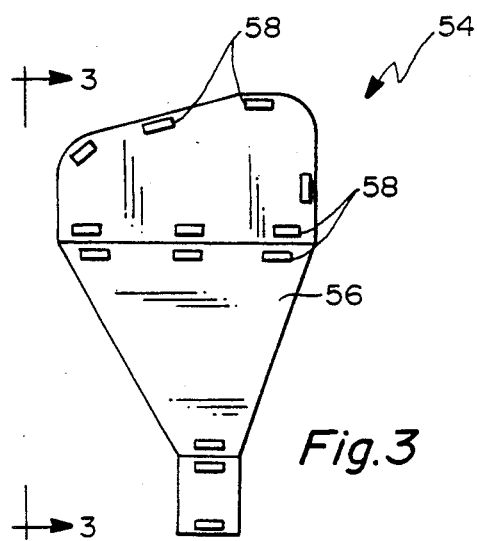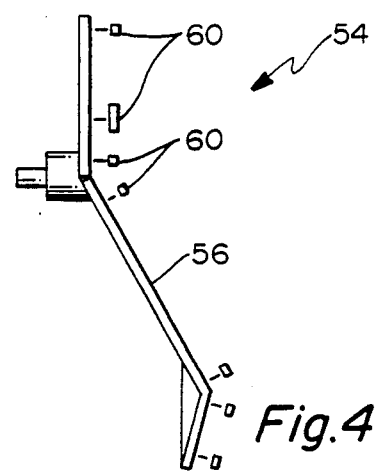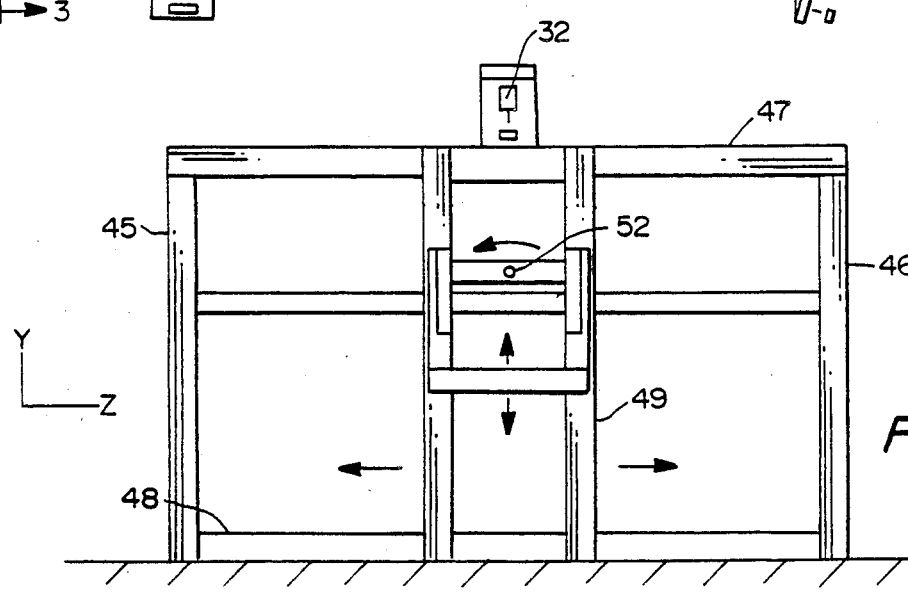

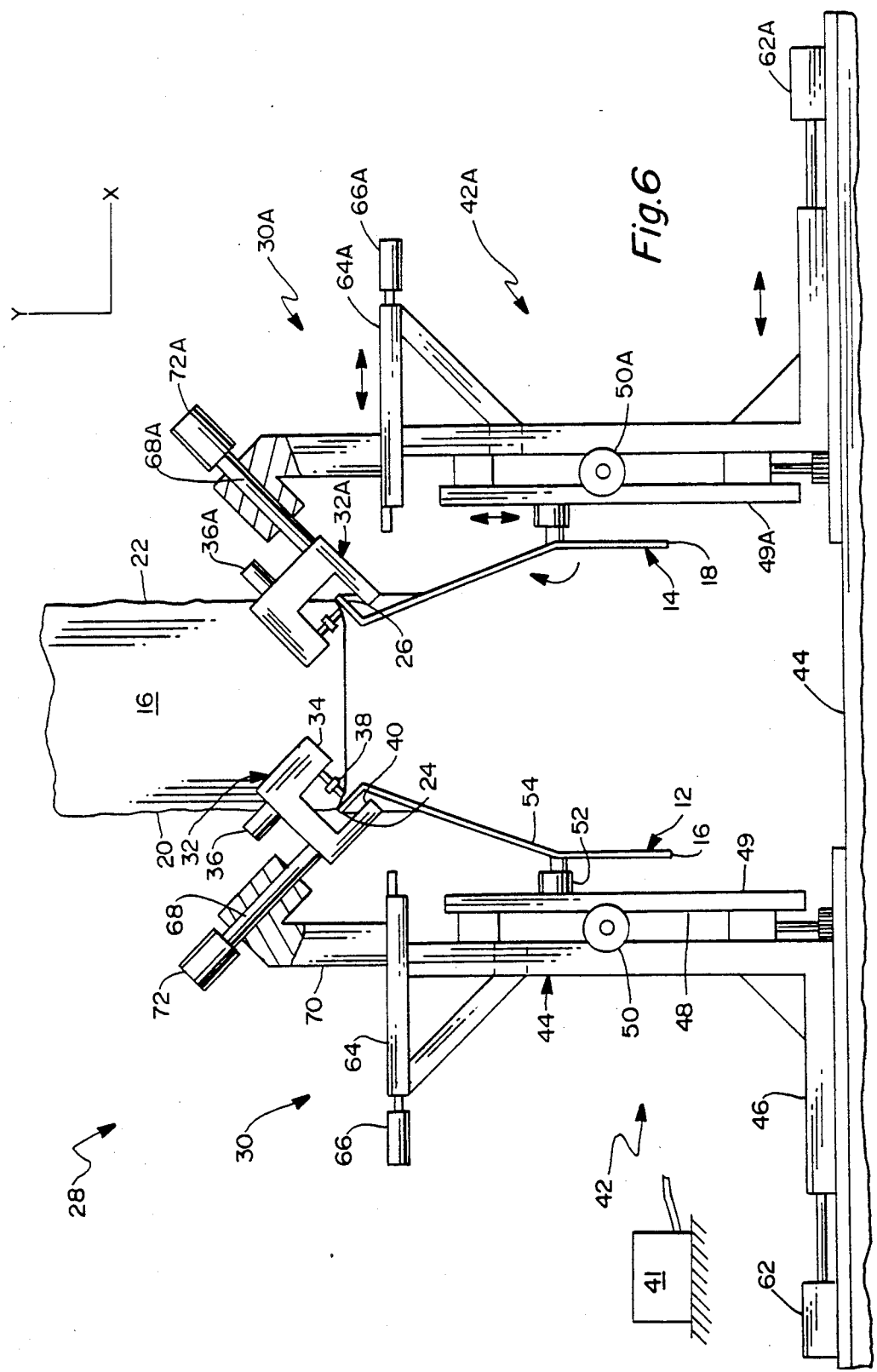

SEWING APPARATUS AND METHOD FOR MANUFACTURING VEHICULAR AIR BAGS

BACKGROUND OF THE INVENTION

Vehicular air bags have been recognized as one of the most effective means for ensuring the safety of passengers in automotive vehicles. The air bags are formed from a very strong synthetic material which is collapsed into a tightly folded condition and stored in the passenger compartment of the vehicle. The driver side air bag generally is disposed within the hub of the steering wheel, while passenger side front seat air bags are disposed in a special compartment of the dashboard. The air bags are operatively connected to sources of compressed air and to electronic sensors which rapidly direct a flow of air into the air bag in response to a sensed impact. The rapid movement of air into the air bag causes the air bag to quickly inflate to provide a cushion against which the vehicular occupant is urged in response to the impact of the collision. The air bag will then rapidly deflate.

The air bag of a vehicle is sewn together from a plurality of pieces of material such that in its inflated condition, the air bag will define an appropriate three-dimensional configuration for the particular shape of the passenger compartment. Since the size and shapes of vehicles vary considerably, the sizes and shapes of air bags also are subject to substantial variation. Air bags are seldom symmetrical, in view of the generally non-symmetrical configuration of the passenger compartment into which the air bags inflate. A typical air bag will comprise first and second side panels and a main body panel extending between and connecting the side panels along tightly sewn seams. In view of the irregular shape required for the inflated air bag, the seams may not be parallel nor of equal lengths.

The unusual three-dimensional configuration of vehicular air bags, and the considerable variation in shape for the air bags of different models of vehicles have resulted in air bags being manufactured in labor intensive manufacturing processes performed on conventional sewing machines. In particular, sewing machine operators merely take peripheral edge regions of pre-cut sections of an air bag and manually advance the peripheral edge regions through a conventional sewing machine. This process is extremely costly and time consuming. The cycle time for completing the sewing of an air bag generally is in the range of 15-30 minutes. The manufacturing problems will become even greater as more vehicles include air bags as standard equipment.

Sewing machines have been provided for varying degrees of automation. Prior art sewing machines include workpiece support tables that move a workpiece through a programmed pattern relative to a substantially fixed sewing head and bobbin head. Other automated sewing systems include an interconnected sewing head and bobbin head that move relative to a substantially fixed workpiece. Still other prior art sewing systems merely include two-dimensional templates to define a sewing path through which a workpiece is guided. Prior art sewing machines have further included workpiece feed means for linearly feeding the material to be sewn into and/or out of the sewing machine.

In view of the above, it is an object of the subject invention to provide a sewing system for automatically manufacturing vehicular air bags.

It is another object of the subject invention to provide a system that can readily be altered to manufacture air bags of different configurations.

It is a further object of the subject invention to provide a programmable sewing system that can readily accommodate the irregular three-dimensional configurations of a vehicular air bag and that can easily be converted to sew other irregular air bag configurations.

It is an additional object of the subject invention to provide a sewing system comprising a plurality of pairs of sewing and bobbin heads that are independently movable relative to one another through a plurality of different axes to sew irregular seams on a vehicular air bag.

Still an additional object of the subject invention is to provide a three-dimensional template which can undergo complex movements that are coordinated with the movement of a plurality of sewing machines.

SUMMARY OF THE INVENTION

The subject invention is directed to an apparatus for assembling vehicular air bags, and to a process employing the apparatus. The vehicular air bag comprises a plurality of panels of material that are sewn together around seams having carefully controlled stitch spacing. The air bag may comprise opposed side panels and a main body panel extending between the side panels and stitched thereto. The side panels are not necessarily of identical configuration and generally are not parallel. As a result, the seams extending along opposed sides of the main body panel normally will not be parallel. However, the apparatus and process of the subject invention may be employed on symmetrical air bags having identical and parallel opposed side panels.

The apparatus of the subject invention may comprise at least one template or master part corresponding to a shape of a selected portion of the air bag in an inflated condition. More particularly, the apparatus may comprise a single three dimensional template or master part substantially conforming to the shape of at least a portion of the inflated air bag. Preferably, however, the apparatus comprises a pair of such three-dimensional templates disposed in selected spaced relationship to one another and substantially corresponding to the shape of the respective side panels of the air bag in a fully or partly inflated condition.

The template of the subject apparatus may be mounted to rotate about an axis. The rotational axis of the template may be disposed in a horizontal plane. The template may further comprise means for mounting the respective side panels of the air bag thereto. The mounting means may comprise arrays of magnets and ferrous metal members. Thus, the side panels of the air bag may be rotatable with the template about a common axis. The axis of rotation may be disposed to extend through a substantially central portion of the air bag side panels.

The apparatus of the subject invention may further comprise means for feeding the main body panel. The feeding means may comprise a roll mounted for rotation about a substantially horizontal axis, with the roll being disposed in spaced relationship to the rotatable template. The roll may comprise enough of the main body panel material to form a plurality of air bags. Thus, the roll may be periodically cut by an operator of the apparatus or by mechanical cutting means associated with the apparatus. Alternatively, the feeding means for the main body panel may be operative to feed a length of the main body panel material corresponding to the length required for a single air bag. The apparatus is operative to permit feeding of the material for the main body panel at a rate substantially corresponding to the linear speed of peripheral portions of the side panels as they rotate with the associated template.

The apparatus of the subject invention may further comprise at least one sewing machine and preferably a pair of sewing machines for sewing opposed longitudinal side edges of the main body panel to the opposed peripheral edge regions of the respective side panels. Each sewing machine may be mounted to a frame, or other such support means, for supporting the sewing machine in selected spaced relationship to the template and the air bag side panels mounted thereto. The template rotating means may also be mounted to a portion of the frame. Each frame, with the sewing machine and the template rotating means mounted thereto, may be movable in a direction toward and away from the other frame. More particularly, these movements may be carried out along a direction extending generally parallel to the rotational axis of the template. Movements of the frame parallel to the rotational axis of the template may be carried out to facilitate changing of the templates and to accommodate sewing of air bags of different dimensions and having different templates thereon. These movements may be defined as X-axis movements and may be carried out by air cylinder means or by electronic servomotor means operatively connected to control means for controlling the operations of the apparatus as explained herein.

Means may also be provided for generating secondary X-axis movement of the sewing machine relative to the remainder of the frame. These secondary X-axis movements of the sewing machine may be independent of any X-axis movement of the template rotating means. The object of these movements may be to account for changes in the geometry of the air bag. The result of these secondary X-axis movements will be to move the sewing machines toward or away from one another as the templates are rotating and as the main body panel is being fed into position. The secondary X-axis movements of either sewing machine relative to the respective frames may be independent of corresponding movements in the other sewing machine. Thus, each sewing machine will undergo these X-axis movements in accordance with the configuration of the side of the air bag being sewn.

The frame may further include means for effecting movement in at least one direction extending orthogonal to the rotational axis of the template. These latter movements may comprise substantially vertical or Y-axis movements and horizontal Z-axis movements. The Y-axis and Z-axis movements may be operative to change the position of the rotational axis of the associated template relative to the sewing machine. In this regard, the frame to which both a sewing machine and a template rotating means are mounted may be extensible in a plurality of different directions. These relative Y-axis and Z-axis movements may be carried out between sewing operations to accommodate air bags of different dimensions, or during a sewing operation to accommodate noncircular geometrical changes in at least one side of the air bag. The frames may further include means for rotating the sewing machines about an axis extending substantially orthogonal to the movement of the sewing machine needle. More particularly, the rotational axis of the sewing machine may be disposed in the plane defined by the X and Y-axes, and may be disposed at an angle of between approximately 30° and 60° to the X-axis. The object of the rotational movements of the sewing machine is to ensure optimum alignment of the sewing machine needle to the portion of the seam being sewn, and to account for small radius changes in the geometry of the air bag.

Each sewing machine may further include its own motor which is capable of operating at varying speeds. The motors may be operative to drive one sewing machine at a faster rate than the opposed sewing machine. This ability of the sewing machines to selectively operate at different rates enables equivalent stitch densities to be achieved on opposed sides of the sewing machine in instances where the geometry of the air bag requires one sewing machine to traverse a greater distance than the other for any given angular rotation of the respective side panels.

The assembly of apparatus of the subject invention further includes control means for coordinating the operations of the sewing machines, the movement of the frame, and the rotation of each template. The control means may be operative to control the movements of the apparatus for completing the cycle required for sewing an air bag. The control means may further be operative to alter the movements to enable sewing of a plurality of different air bags.

BRIEF DESCRIPTION OF THE DRAWINGS

FIG. 1 is a top plan view of an air bag manufactured by the apparatus and according to the process of the subject invention.

FIG. 2 is a side elevational view of the air bag shown in FIG. 1.

FIG. 3 is an end elevational view of the apparatus of the subject invention.

FIG. 4 is a cross-sectional view taken along line 4—4 in FIG. 3.

FIG. 5 is a top plan view of a template in accordance with the subject invention.

FIG. 6 is a side elevational view of the template shown in FIG. 5.

DETAILED DESCRIPTION OF THE PREFERRED EMBODIMENT

A vehicular air bag manufactured by the apparatus of the subject invention is identified generally by the numeral 10 in FIGS. 1 and 2. The air bag 10 comprises a first side panel 12, a second side panel 14 and a main body panel 16 extending therebetween. The first and second side panels 12 and 14 include peripheral edges which typically are of irregular noncircular configuration, and typically are not identical to one another. The main body panel 16 defines an elongated strip having opposed longitudinally extending side edges. One side edge of the main body panel 16 is sewn tightly to the peripheral edge of the first side panel 12 to define a first side seam 18 of the air bag 10 made by the apparatus described herein. Similarly, the opposed side edge of the main body panel 16 is sewn to the peripheral edge of the second side panel 14 to define a second side seam 20 for the air bag 10 manufactured by the subject apparatus. The resulting air bag 10 includes an opening 22 of relatively small dimension.

The particular shape of the air bag 10 manufactured from the first and second side panels 12 and 14 and the main body panel 16 is selected in accordance with the size and configuration of the passenger compartment in the vehicle in which the air bag 10 is to be used. In view of the vast differences in the sizes and shapes of passenger compartments for different vehicles, the air bags 10 for different vehicles will vary considerably from one another. Furthermore, the air bags 10 often will not be symmetrical, thereby resulting in the first and second seams 18 and 20 being nonparallel, unregistered and/or of different respective lengths.

The assembly of apparatus for forming the air bag 10 is identified generally by the numeral 28 in FIGS. 3 and 4 and comprises a first sewing apparatus 30 and second sewing apparatus 30A disposed for sewing the first and second seams 24 and 26 respectively of the air bag 10. The first and second sewing apparatus 30 and 30A are substantially identical to one another, and similar numbers are used herein to define comparable components of each sewing apparatus 30 and 30A. In the following description, only the first apparatus 30 will be described in detail, but it will be understood that comparably numbered components of the second apparatus 30A are structurally and functionally similar to those described for the first apparatus 30. It should be noted, however, that the first and second sewing apparatus 30 and 30A do not necessarily work symmetrically with one another. Rather, the first and second sewing apparatus 30 and 30A are capable of entirely independent function in accordance with changes in shape of the respective first and second side panels 12 and 14 and the first and second seams 24 and 26. Only in those situations where the air bag is perfectly symmetrical will the first and second sewing apparatus 30 and 30A be performing exactly the same functions at symmetrical locations and at the same speeds.

The first sewing apparatus 30 comprises a sewing machine 32 having a frame 34 to which an electric sewing machine servomotor 36 is mounted. The sewing machine servomotor 36 is operative to drive a sewing needle 38 and a bobbin assembly which is identified generally by the numeral 40. The sewing machine servomotor 36 is operatively connected to a control means which is illustrated schematically and is identified generally by the numeral 41. The servomotor 36 is capable of driving the sewing needle 38 and the bobbin assembly 40 at speeds which are selected in accordance with signals generated by the control means 41. It should be noted that the second sewing machine 32A is driven by a second sewing machine servomotor 36A which also is operatively connected to the control means 41. The control means 41 will generate signals to the second sewing machine servomotor 36A for driving the operative components of the second sewing machine 32A at speeds that are dictated by the geometry of the air bag, such that the speeds of the first and second sewing machines 32 and 32A may occasionally be different from one another.

The first sewing machine 32 is mounted to a first frame which is identified generally by the numeral 42, while the second sewing machine 32A is mounted to a second frame 42A. The first and second frames 42 and 42A are movably mounted to a base 44 which, in the embodiment depicted in FIG. 1, is rigidly mounted in a substantially horizontal plane.

The following description pertains to the first frame 42, but it is understood that the comparably numbered parts of the second frame 42A will function similar to those described herein for the first frame 42. The first frame 42 includes vertical end supports 45 and 46 and top and bottom horizontal supports 47 and 48. A template frame 49 is movably mounted to the top and bottom horizontal supports 47 and 48 for selective horizontal end-to-end or Z-axis movements along the horizontal supports 47 and 48. Relative Y-axis movements of the template frame 49 are carried out by a servomotor 50 which is operatively connected to the control means 41.

The template frame 49 further includes a rotatable template mounting means 52 positioned thereon, for rotatable movement about a generally horizontal or X-axis extending substantially parallel to the base 44. The rotatable template mounting means 52 includes a servomotor which operatively connected to the control means 41.

A template 54, as shown in FIGS. 3, 5 and 6, is removably mounted to the rotatable template mounting means 52. The template 54 includes a mounting face 56 which corresponds to the shape of the first side panel 12 when the air bag 10 is inflated. The template 54 includes magnets 58 embedded in the mounting face 56 for mounting the first side panel 12 thereto. More particularly, note ferrous metal pads 60 which generally conform to the shape of the magnets 58. The first side panel 12 is placed over the mounting face 56 of the template 54. The pads 60 are then placed over the first side panel 12 and in line with the magnets 58 such that the first side panel 12 is retained in proper alignment on the mounting face 56 of the template 54 by the engagement between the magnets 58 and the ferrous metal pads 60. As shown in FIG. 5, the magnets 58 are disposed in spaced relationship about the periphery of the template 54 and at the intersection of angularly aligned surfaces. The mounting of the template 54 to the rotatable template mounting means 52 enables rotation of the template 54 and the first side panel 12 mounted thereon about a horizontal axis. The relative Y-axis position of the rotational axis is determined by the servomotor 50 which controls the Y-axis position of the template mounting means 52 on the template frame 49.

It should be noted that the second apparatus 30 includes a second template frame 49A which is connected to the second frame 42A. The servomotor 50A is operative to alter the Y-axis position of the second rotatable template mounting means 52A. The second Y-axis servomotor 50A also is operatively connected to the control means 41. In this instance, the control means 41 is operative to ensure that the first and second Y-axis servomotors 50 and 50A are coordinated such that the rotational axes of the first and second rotatable template mounting means 52 and 52A are substantially coaxial. Thus, the first and second rotatable template mounting means 52 and 52A will be operative to rotate the first and second templates 54 and 54A and the first and second side panels 12 and 14 about the same rotational axis. It will also be understood that in view of the vast differences between air bag sizes and configurations, the relative elevational position of the rotatable template mounting means 52, 52A can vary significantly from one air bag to the next. As will be explained further herein, the primary purpose of the first and second rotatable template mounting means 52 and 52A is to ensure that the peripheral edges of the first and second side panels 12 and 14 are presented properly to the respective first and second sewing machines 32 and 32A and are rotated at an appropriate speed to present the first and second seams 24 and 26 to the respective first and second sewing machines 32 and 32A at a rate that will achieve the specified stitch density.

The bottom horizontal support member 48 of the first frame 42 is movably mounted on the base 44 parallel to the X-axis. The motion of the bottom horizontal support member 48 is generated by an air cylinder 62 which is operatively connected to the control means 41. Forces generated by the air cylinder 62 on the bottom horizontal support member 48 will cause the entire first sewing apparatus 30 to move toward or away from the second sewing apparatus 30A. These X-axis movements generated by the actions of the air cylinder 62 on the bottom horizontal support member 48 will be carried out to set a proper spacing between the first and second sewing apparatus 30 and 30A in accordance with the dimensions of the air bag 10 being sewn. Furthermore, the movements of the first and second sewing apparatus 30 and 30A away from one another will be carried out to enable changing of the templates 54, 54A and to ensure proper mounting of the side panels 12 and 14 to the respective templates 54 and 54A.

The first frame 42 further includes a first horizontal sewing machine support 64 which is mounted to a portion of the top horizontal support 47. The horizontal sewing machine support 64 defines a track which permits movement of the first sewing machine 32 toward or away from the second sewing machine 32A, but independent of corresponding movements of the first template 54. Thus, the air cylinder 62 acting on the bottom horizontal support 48 enables gross movements of the entire first sewing apparatus 30, including the first sewing machine 32 and the first template 54. On the other hand, the horizontal sewing machine support 64 enables horizontal movements of the first sewing machine 32 independent of movements of the template 54. These horizontal movements of the first sewing machine 32 are carried out by a first X-axis servomotor 66 which is operatively connected to the control means 41. Movements of the sewing machine 32 independent of the first template 54 are carried out to ensure proper positioning of the first sewing machine 32 to the air bag 10, and more particularly account for X-axis geometrical changes of the template 54. Movements of the first sewing machine 32 caused by the operation of the first X-axis servomotor 66 can be entirely independent of movements of the second sewing machine 32A caused by the operation of the second X-axis servomotor 66A. Thus, the first and second sewing machines 32 and 32A can selectively move toward or away from one another entirely independent of the other sewing machine in order to account for X-axis geometrical changes in the first and second templates 54 and 54A.

The first sewing machine 32 is mounted to a shaft 68 which in turn is mounted to a vertical sewing machine support 70. More particularly, the shaft 62 is aligned at an angle of between approximately 30° and 60° to the horizontal sewing machine support 64, and preferably at an angle of approximately 45°. The shaft 68 is operatively connected to a rotary servomotor 72 which is operative to rotate the shaft 66 and the sewing machine 32 to ensure proper alignment of the sewing machine 32 to the portion of the seam 24 being sewn. The servomotor 66 is operatively connected to the control means 41 to ensure that the rotational movements of the sewing machine 32 generated by the rotary servomotor 66 are carried out in accordance with the particular changing geometry of the seam 24 passing in proximity to the sewing machine 32.

In operation, appropriate first and second templates 54 and 54A are mounted to the first and second rotary template mounting means 52 and 52A. The first and second templates 54 and 54A may not be identical to one another, but will correspond to the particular geometry for the air bag 10. Generally a fairly large number of air bags of a selected geometry will be manufactured in a run prior to switching over to different template configurations. First and second side panels 12 and 14 are mounted to the respective first and second templates 54 and 54A by affixing the ferrous metal pads 60 to the magnets 58 on the mounting face of the template 54, 54A. The first and second frames 42 and 42A are then positioned in a selected spaced relationship to one another by the actions of the air cylinder 62, 62A exerting forces on the frames 42 and 42A. In view of these forces, the entire first and second frames 42 and 42A are slid horizontally on the horizontal base 44 such that the first and second templates 54 and 54A and the first and second side panels 12 and 14 of the air bag 10 respectively are in the specified spaced relationship to one another.

The vertical template frames 49 and 49A are then moved in a Z-axis direction relative to the remainder of the frame 42, 42A, and under the action of the servomotors 50 and 50A, the rotatable template supports 52, 52A are moved vertically along the template frames 49, 49A. These movements of the template frames 49, 49A and the rotatable template supports 52, 52A are to ensure that the peripheral edges of the first and second air bag side panels 12 and 14 are in proper position relative to the respective first and second sewing machines 32 and 32A. The main body panel 16 is then fed into the apparatus 28 such that the opposed longitudinal edges 20 and 22 thereof are in register with the peripheral edges of the respective first and second side panels 12 and 14 of the air bag 10. The apparatus 28 has now been advanced into a position for sewing the seams 24 and 26 which effectively create the air bag from the plurality of separate panels. It is to be understood that the X-axis and Y-axis movements described above are carried out automatically in accordance with signals generated by the control means 41. It is also to be understood that the gross X-axis adjustments generated by the air cylinders 62 and 62A will be carried out only once for a particular run of air bags 10. Such a run is likely to last at least several days, thereby obviating the need to make these adjustments during the normal operation of the apparatus 10 as explained below.

The operation of the apparatus proceeds by rotating the templates 54 and 54A about the rotatable template mounting means 52 and 52A in accordance with signals generated by the control means 41. The templates 54 and 54A normally will rotate at substantially identical rotational speeds. However, in certain instances, one rotational speed may exceed that of the other, such as in instances where the air bag may be of generally frustoconical configuration, with one seam 24, 26 being of substantially shorter length than the other. The main body panel 16 is fed into the apparatus 10 at a rate corresponding to the speed of the peripheral edges of the first and second side panels 12 and 14. As the geometry of the first and second templates 54 and 54A and the first and second side panels 12 and 14 changes, the first and second sewing machines 32 and 32A may move selectively toward or away from one another. These horizontal movements of the first and second sewing machines 32 and 32A are along the horizontal sewing machine frames 64 and 64A and are caused by the actions of the X-axis servomotors 66 and 66A in accordance with signals generated by the control means 41. The movements generated by the X-axis servomotors 66 and 66A are entirely independent of one another. At selected positions in the sewing of seams 24 and 26, the first or second sewing machine 32 or 32A may rotate about the shaft 68 or 68A under the power of the rotary servomotor 72 and 72A. The servomotors 72 and 72A again operate in accordance with signals generated by the control means 41. As noted above, these rotary movements of the first and second sewing machines 32 and 32A are to ensure optimum alignment of the sewing needles 38, 38A and bobbin assemblies 40, 40A to the respective seams 24, 26 being sewn.

The control means 41 is operative to rotate the templates 54 and 54A substantially identical angular amounts to complete the sewing of the seams 24 and 26, and to thereby define the air bag. In embodiments where the main body panel 16 is drawn from a continuous strip, known cutting means may then be employed to sever the strip of material defining the main body panel 16 from the continuing roll of such material. This cutting means may be automatic, or may be manual scissors employed by an operator of the apparatus. However, it is to be understood that the operator's function is primarily supervisory, with periodic feeding of material and removal of completed air bags. The actual sewing and feeding of material is carried out automatically by the apparatus 10.

In summary, an apparatus and process is provided for automatically sewing the seams required to manufacture a vehicular air bag. The air bag comprises opposed first and second side panels and a main body panel extending therebetween. The first and second side panels are mounted to templates which are rotatably mounted to the apparatus. The apparatus includes a frame with means for permitting both X-axis and Y-axis adjustments to the positions of the templates and the air bag side panels mounted thereto. Sewing machines are mounted to the frames and are movably mounted for selective complex movements which may comprise at least X-axis adjustments and rotary adjustments to the sewing machines. The sewing function is carried out as the first and second side panels are rotated relative to the sewing machine to advance peripheral edge portions through the sewing machines. Simultaneously, the main body panel is fed into the apparatus to enable longitudinal side edges thereof to be sewn to the peripheral regions of the air bag side panels. All of the movements and sewing activities are controlled by a control means which generates signals in accordance with the geometry of the particular air bag being sewn.

I claim:

1. An assembly of apparatus for manufacturing a vehicular air bag, said air bag comprising first and second side panels having peripheral edges and a main body panel having longitudinal side edges to be sewn to the peripheral edges of the air bag side panels, said apparatus comprising:

template means for mounting the first and second side panels thereto;
   template rotating means for rotating the template means and the air bag side panels mounted to the template means;
   first and second sewing machines for sewing the peripheral edges of said first and second side panels to the longitudinal side edges of the main body panel;
   movable frame means for mounting the sewing machines in selected proximity to the template means and for moving the sewing machines relative to the template means for maintaining a selected alignment and spacing of the sewing machines relative to the template means, whereby the template means is rotated to advance the peripheral edges of the first and second side panels relative to the first and second sewing machines and whereby the frame means is adjusted to position the sewing machines relative to the template means for sewing the first and second side panels to the main body panel.

2. An apparatus as in claim 1 wherein the sewing machines are independently movable relative to one another to follow the respective configurations of the side panels.

3. An apparatus as in claim 1 wherein the first and second sewing machines are mounted to first and second frames respectively, said first and second frames being selectively movable toward and away from one another.

4. An apparatus as in claim 1 further comprising template adjustment means mounted to the frame means for changing the position of the template means relative to the sewing machines.

5. An apparatus as in claim 1 further comprising first and second rotary adjustment means mounted to the first and second frames respectively, said rotary adjustment means being operative to change the rotational alignment of the sewing machine relative to the frame.

6. An apparatus as in claim 1 further comprising first and second sewing machine adjustment means for moving the first and second sewing machines independently toward or away from one another and relative to the template means.

7. An apparatus as in claim 1 wherein the template means comprises first and second templates independently rotatable relative to the sewing machines.

8. An apparatus as in claim 7 wherein each said template is of three-dimensional configuration.

9. An apparatus as in claim 7 wherein each said template comprises magnetic means for mounting the associated side panel thereto.

10. A method for manufacturing a vehicular air bag, said air bag comprising first and second opposed side panels and a main body panel, said method comprising the steps of:

providing at least first and second rotatable templates substantially corresponding to the shapes of the first and second side panels;
   providing first and second sewing machines selectively movable relative to one another;
   mounting the first and second side panels to the first and second templates, such that peripheral regions of the first and second side panels are in proximity to the sewing machines;
   positioning the main body panel in proximity to the sewing machines and the peripheral regions of the first and second side panels;
   rotating the templates and the first and second side panels mounted thereto relative to the first and second sewing machines, while simultaneously advancing the main body panel toward the sewing machines; and
   operating the sewing machines to sew the longitudinal side edges of the main body panel to the peripheral edges of the first and second side panels as the template is rotating.

11. A method as in claim 10 further comprising moving the sewing machines relative to the template in accordance with the geometry of each respective side panel.

12. A method as in claim 10 comprising mounting the first and second side panels to the templates by magnets.

* * * * *